(12) United States Patent
Ito et al.

(10) Patent No.: US 8,439,569 B2
(45) Date of Patent: May 14, 2013

(54) COMBINED BEARING AND ROTARY MACHINE

(75) Inventors: Kazuma Ito, Tokyo (JP); Kazuyuki Tatsuta, Kanagawa (JP); Tetsuro Sugiura, Kanagawa (JP)

(73) Assignee: Ebara Corporation, Tokyo (JP)

( * ) Notice: Subject to any disclaimer, the term of this patent is extended or adjusted under 35 U.S.C. 154(b) by 326 days.

(21) Appl. No.: 12/915,406

(22) Filed: Oct. 29, 2010

(65) Prior Publication Data

US 2011/0103986 A1  May 5, 2011

(30) Foreign Application Priority Data

Nov. 2, 2009 (JP) ................................ 2009-251919

(51) Int. Cl.
*F16C 33/66* (2006.01)
*F01M 11/02* (2006.01)

(52) U.S. Cl.
USPC ........... 384/465; 184/11.2; 384/473; 384/474

(58) Field of Classification Search ................... 384/474, 384/475, 499, 504, 512
See application file for complete search history.

(56) References Cited

U.S. PATENT DOCUMENTS

| | | | |
|---|---|---|---|
| 4,712,442 A * | 12/1987 | Baika et al. | 184/11.2 |
| 5,009,523 A * | 4/1991 | Folger et al. | 384/475 |
| 5,558,180 A | 9/1996 | Yanagisawa | |
| 6,227,713 B1 | 5/2001 | Neder et al. | |
| 6,431,760 B1 | 8/2002 | Nawamoto et al. | |
| RE39,217 E * | 8/2006 | Rockwood | 184/11.2 |
| 2009/0129714 A1* | 5/2009 | Shimomura | 384/475 |

FOREIGN PATENT DOCUMENTS

| | | |
|---|---|---|
| DE | 297 04 386 | 4/1997 |
| DE | 100 45 163 | 6/2001 |
| EP | 0 677 672 | 10/1995 |
| GB | 2 389 631 | 12/2003 |
| JP | 55-034026 | 3/1980 |
| JP | 59-1929 | 7/1984 |
| JP | 61-109914 | 5/1986 |
| JP | 1-229114 | 9/1989 |
| JP | 9-88947 | 3/1997 |
| JP | 10-318255 | 12/1998 |

OTHER PUBLICATIONS

European Search Report issued Feb. 24, 2001 in European Application No. 10 01 4211. (English language).

* cited by examiner

*Primary Examiner* — Thomas R Hannon
(74) *Attorney, Agent, or Firm* — Wenderoth, Lind & Ponack, L.L.P.

(57) ABSTRACT

A highly reliable combined bearing capable of achieving equal and sufficient lubrication of a plurality of roller bearings with a simple and compact structure is provided. The combined bearing includes a first roller bearing and a second roller bearing which are in contact with each other and arranged on the same axis. A lubricating oil inlet introduces a lubricating oil into an inner space formed between the first roller bearing and the second roller bearing, the lubricating-oil inlet being provided on at least one of an outer ring of the first rolling bearing and an outer ring of the second rolling bearing.

15 Claims, 8 Drawing Sheets

COMBINED BEARING AND ROTARY MACHINE

BACKGROUND OF THE INVENTION

1. Field of the Invention

The present invention relates to a highly reliable combined bearing with an excellent lubricity. The present invention also relates to a rotary machine using such a combined bearing.

2. Description of the Related Art

Conventionally, a combined bearing for supporting a rotational shaft is used in a rotary machine, such as a vacuum pump. FIG. 8 shows an example of a combined bearing. As shown in FIG. 8, a combined bearing 500 has two or more rolling (roller) bearings 501 and 503 which are joined to each other directly (or indirectly through a spacer therebetween). Types of the rolling bearings used include a ball bearing (e.g., an angular ball bearing or a deep groove ball bearing) and a roller bearing. Lubricating and cooling of the combined bearing 500 are performed by supplying a lubricating oil from an outer side surface of the combined bearing 500 as indicated by arrow a1 in FIG. 8 (for example, see Japanese laid-open patent publication No. 1997-88947).

However, because the lubricating oil is supplied from the outer side surface of the rolling bearing 501 as shown in FIG. 8, the lubricating oil is not smoothly supplied into an inner space between the rolling bearings 501 and 503. As a result, sufficient lubrication cannot be achieved. Further, a smaller amount of the lubricating oil is supplied to the rolling bearing 503 which is located at the opposite side of where the lubrication oil is supplied, as compared with the rolling bearing 501 to which the lubrication oil is supplied. As a result, sufficient lubrication of the rolling bearing 503 may not be performed, compared with the rolling bearing 501. In order to lubricate both of the rolling bearings 501 and 503 equally, it is possible to supply the lubricating oil from both outer side surfaces of the rolling bearings 501 and 503. However, two supply routes are needed for the lubricating oil, thus making the structure complex.

SUMMARY OF THE INVENTION

The present invention has been made in view of the above drawbacks. It is therefore an object of the present invention to provide a highly reliable combined bearing which can achieve equal and sufficient lubrication of a plurality of rolling (roller) bearings and has a simple and compact structure. It is another object of the present invention to provide a rotary machine using such a combined bearing.

One aspect of the present invention provides a combined bearing including: a first rolling bearing and a second rolling bearing which are in contact with each other and arranged on the same axis; and a lubricating-oil inlet for introducing a lubricating oil into an inner space formed between the first rolling bearing and the second rolling bearing. The lubricating-oil inlet is provided on at least one of an outer ring of the first rolling bearing and an outer ring of the second rolling bearing.

According to the present invention as recited above, the lubricating oil can be directly supplied into the inner space between the adjacent rolling bearings. Therefore, these rolling bearings can be lubricated easily, evenly, and sufficiently with the lubricating oil. Further, a simple and compact structure can be obtained.

In a preferred aspect of the present invention, the lubricating-oil inlet is a groove formed on a side surface of the outer ring of the second rolling bearing, and the side surface is in contact with a side surface of the outer ring of the first rolling bearing.

According to the present invention as recited above, the lubricating-oil inlet can be formed only by providing the groove on the side surface of the outer ring of the rolling bearing. Therefore, the number of components can be reduced. As a result, a simple and compact structure can be achieved and a production cost can be reduced.

In a preferred aspect of the present invention, the lubricating-oil inlet is grooves formed respectively on a side surface of the outer ring of the first rolling bearing and a side surface of the outer ring of the second rolling bearing, and the side surface of the first rolling bearing and the side surface of the second rolling bearing are in contact with each other.

According to the present invention as recited above, the lubricating-oil inlet can be formed only by providing the grooves on the side surfaces of the outer rings of the rolling bearings. Therefore, the number of components can be reduced. As a result, a simple and compact structure can be achieved and a production cost can be reduced.

Another aspect of the present invention provides a combined bearing including: a first rolling bearing and a second rolling bearing arranged on the same axis, an outer ring spacer and an inner ring spacer arranged between the first rolling bearing and the second rolling bearing; and a lubricating-oil inlet for introducing a lubricating oil into an inner space formed between the first rolling bearing and the second rolling bearing. The lubricating-oil inlet is provided on the outer ring spacer.

According to the present invention as recited above, the lubricating oil can be directly supplied into the inner space between the adjacent rolling bearings. Therefore, these rolling bearings can be lubricated easily, evenly, and sufficiently with the lubricating oil. Further, a simple and compact structure can be obtained.

In a preferred aspect of the present invention, the lubricating-oil inlet comprises a groove formed on the outer ring spacer.

According to the present invention as recited above, the lubricating-oil inlet can be easily formed only by providing the groove on the outer ring spacer.

Still another aspect of the present invention provides a rotary machine including: the combined bearing; and a rotational shaft supported by the combined bearing.

According to the present invention as recited above, durability and reliability of the rotary machine are improved, because the rotary machine uses the above-described combined bearing.

In a preferred aspect of the present invention, the rotary machine is a vacuum pump.

According to the present invention as recited above, durability and reliability of the vacuum pump are improved, because the vacuum pump uses the above-described combined bearing. The vacuum pump is widely used for a semiconductor fabrication apparatus. If the vacuum pump suddenly stops or any other trouble happens in the vacuum pump, the semiconductor fabrication apparatus in its entirety may be affected and a serious damage may be caused. Accordingly, it is preferable to use the highly durable and reliable combined bearing according to the present invention in the vacuum pump for the semiconductor fabrication apparatus.

DETAILED DESCRIPTION OF THE PREFERRED EMBODIMENTS

Embodiments of the present invention will be described below with reference to the drawings.

Figure 1:
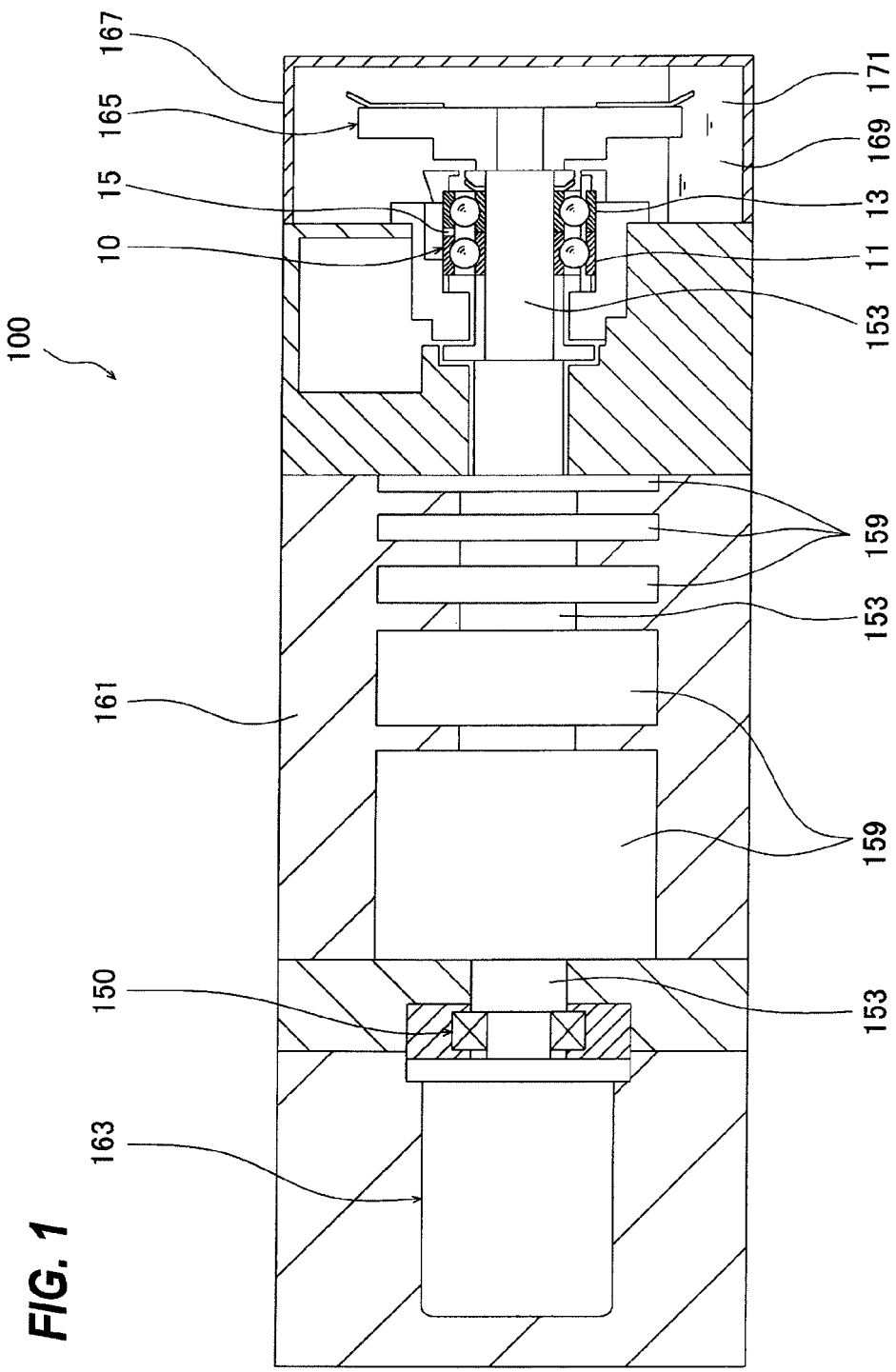
FIG. 1 is a cross-sectional side view schematically showing an example of a vacuum pump using a combined bearing.
Figure 2:
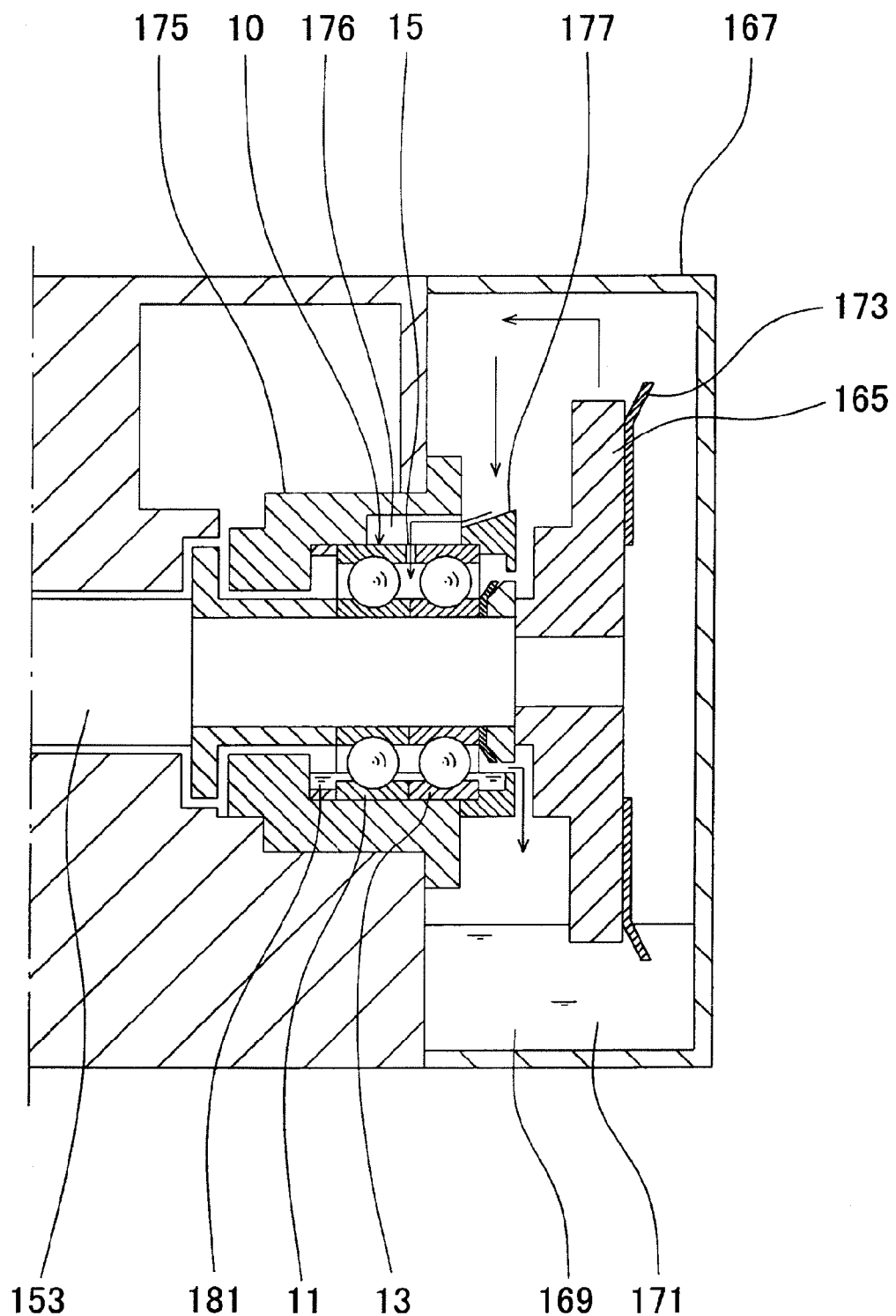
FIG. 2 is an enlarged cross-sectional view schematically showing an essential part including the combined bearing of the vacuum pump.

FIG. 1 is a cross-sectional side view schematically showing an example of a vacuum pump 100 using a combined bearing 10 according to a first embodiment of the present invention. FIG. 2 is an enlarged cross-sectional view schematically showing an essential part including the combined bearing 10 of the vacuum pump 100.

The vacuum pump 100 is a Roots-type dry vacuum pump, which includes two rotational shafts 153 each supported by the combined bearing 10 and a bearing 150. In FIG. 1 and FIG. 2, only one of the rotational shafts 153 is depicted, and the other is installed behind the rotational shaft 153 shown in FIG. 1. The two rotational shafts 153 are arranged horizontally in parallel to each other. Roots rotors 159 are fixed to the rotational shafts 153 and are housed in a rotor casing 161. A motor 163 is coupled to an end portion of one of the two rotational shafts 153 as shown in the drawing. Gears (timing gears) 165 for establishing synchronized rotation of the rotational shafts 153 are secured to the other end portions of the rotational shafts 153, respectively.

As shown in FIG. 2, the gears 165, attached to the end portions of the rotational shafts 153, are housed in a gear case 167. An inner space of the gear case 167 provides a lubricating-oil chamber 171 that stores a lubricating oil 169 therein. Lower portions of the gears 165 are immersed in the lubricating oil 169. An oil plate 173 is attached to one end surface of the gear 165.

The combined bearing 10 includes inner rings and outer rings. The inner rings are secured to a circumferential surface of the rotational shaft 153, and the outer rings are secured to a stationary side by a bearing case 175.

Figure 3:
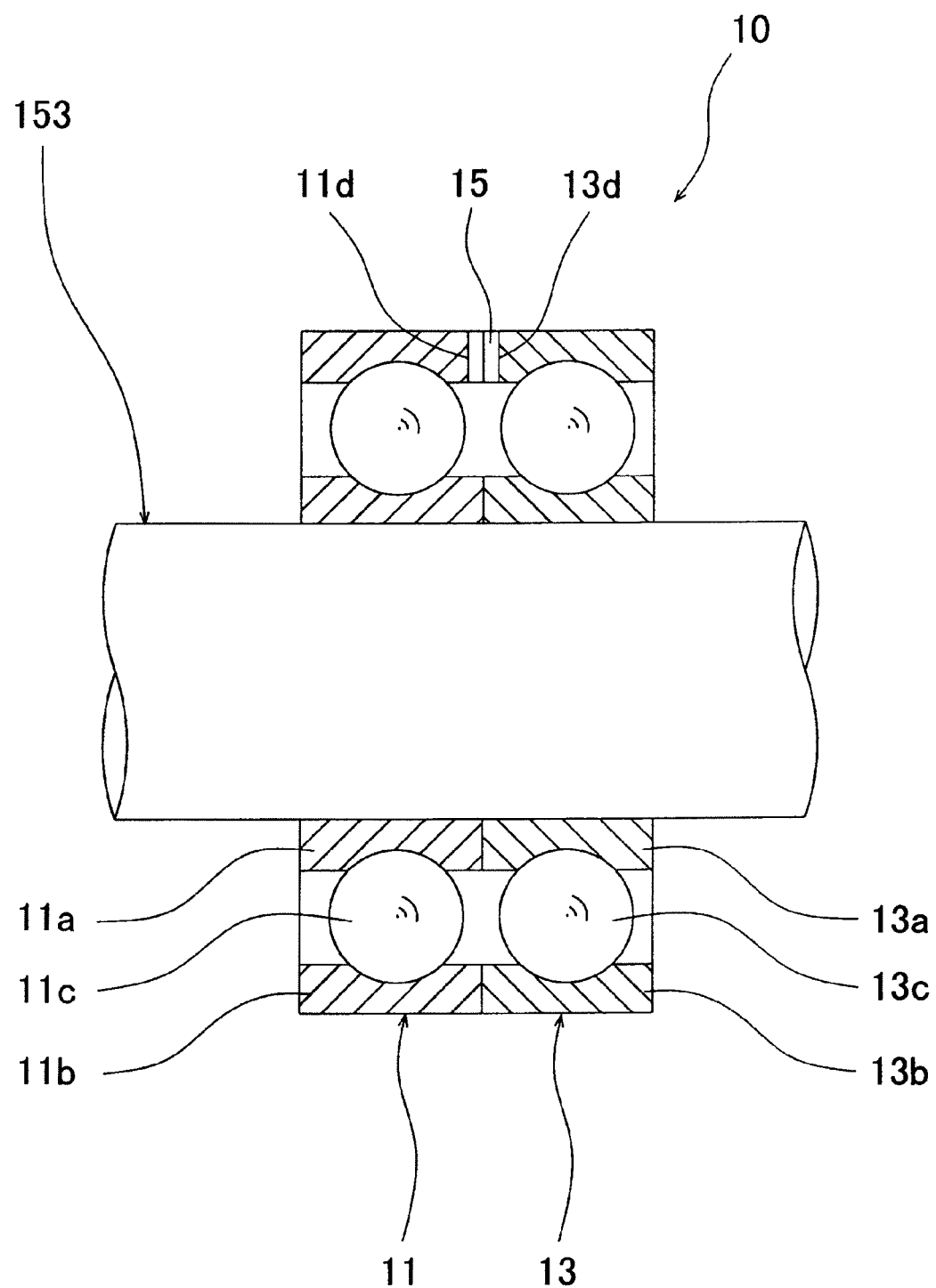
FIG. 3 is an enlarged cross-sectional view showing an essential part of the combined bearing.
Figure 4:
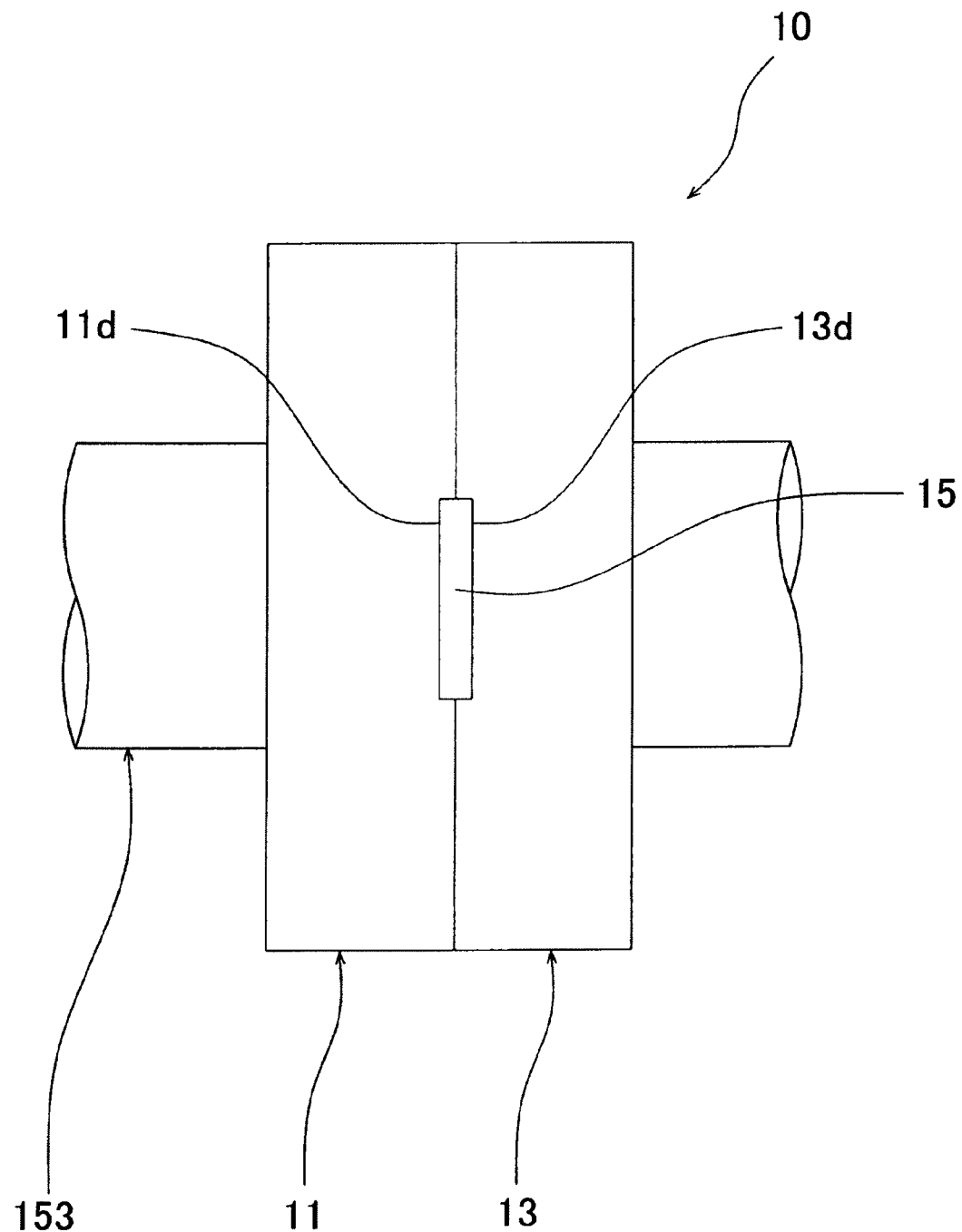
FIG. 4 is a view of the combined bearing in FIG. 3 as viewed from above.

FIG. 3 is an enlarged cross-sectional view showing an essential part of the aforementioned combined bearing 10, and FIG. 4 is a view of the combined bearing 10 in FIG. 3 as viewed from above. As shown in FIG. 3 and FIG. 4, the combined bearing 10 has two rolling (roller) bearings (a first rolling bearing and a second rolling bearing) 11 and 13 whose end surfaces face each other directly (i.e., contact each other) and are joined directly to each other. These rolling bearings 11 and 13 are arranged on the same axis. The rolling bearing 11 has an inner ring 11a, an outer ring 11b, and a plurality of rolling elements 11c arranged between the inner ring 11a and the outer ring 11b. Similarly, the rolling bearing 13 has an inner ring 13a, an outer ring 13b, and a plurality of rolling elements 13c arranged between the inner ring 13a and the outer ring 13b. Radially-extending grooves (or notches) 11d and 13d are formed respectively on side surfaces of the outer rings 11b and 13b that are in contact with each other. The grooves 11d and 13d extend radially from outer circumferential surfaces to inner circumferential surfaces of the outer rings 11b and 13b. The grooves 11d and 13d face each other to form a single lubricating-oil inlet 15.

As the motor 163 shown in FIG. 1 is driven, the rotational shafts 153 are rotated in synchronization with each other in opposite directions, whereby the Roots rotors 159, which are fixed to the rotational shafts 153, are rotated in synchronization with each other in opposite directions. As the Roots rotors 159 are rotated, a gas is trapped in pockets formed by circumferential surfaces of the Roots rotors 159 and an inner circumferential surface of the rotor casing 161, and carried from a suction side to a discharge side. In this manner, evacuation of the gas is performed. Simultaneously, the oil plate 173 and the gear 165 shown in FIG. 2 are rotated to splash the lubricating oil 169 up to a ceiling of the lubricating-oil chamber 171. The lubricating oil 169, attached to the ceiling of the lubricating-oil chamber 171, drops onto a bearing cover 177, as indicated by arrows, and further moves through an introduction passage 176, formed in the bearing case 175, into the lubricating-oil inlet 15. The lubricating oil 169 is thus supplied directly into an inner space formed between the rolling bearings 11 and 13 through the lubricating-oil inlet 15 to thereby lubricate both of the rolling bearings 11 and 13 equally from the inside thereof. Further, in this vacuum pump 100, the lubricating oil 169 is collected in an oil reservoir 181 located at a lower portion of the bearing case 175. A lower portion of the combined bearing 10 is immersed in the lubricating oil 169 retained in the oil reservoir 181. The lubricating oil 169 in the oil reservoir 181 is also splashed up by the rotation of the shaft 153 to lubricate the combined bearing 10. The excess lubricating oil 169 flows beyond the bearing cover 177 and is thus returned to the lubricating-oil chamber 171.

As explained above, the combined bearing 10 according to the present embodiment allows the lubricating oil 169 to be directly supplied into the inner space between the adjacent rolling bearings 11 and 13. Therefore, the lubricating oil 169 can lubricate these plural rolling bearings 11 and 13 easily, evenly, and sufficiently. The vacuum pump 100 using the combined bearing 10 is a dry vacuum pump. Therefore, the combined bearing 10 has to be efficiently lubricated with a minimum amount of the lubricating oil 169. The combined bearing 10 according to this embodiment is advantageous because it can be lubricated with a smaller amount of the lubricating oil 169. Further, the combined bearing 10 has a simple structure that can make it compact.

Especially, according to the combined bearing 10 of this embodiment, the lubricating-oil inlet 15 can be formed only by providing the grooves 11d and 13d on the inner side surfaces of the outer rings 11b and 13b of the rolling bearings 11 and 13. Therefore, the number of components can be reduced, the structure can be simplified, and downsizing and cost reduction can be achieved. Further, unlike bearings 11 and 13 according to a second embodiment which will be described later, spacers 21 and 23 are not used. Therefore, a space for the spacers 21 and 23 can be omitted, and a smaller structure can be obtained. Further, because there is no effect of the accuracy of the spacers 21 and 23, accuracy and reliability of the combined bearing 10 are further improved.

Moreover, use of the above-described combined bearing 10 can also improve durability and reliability of the vacuum pump 100 and can downsize the vacuum pump 100 in its entirety. The vacuum pump 100 is widely used for a semiconductor fabrication apparatus. If the vacuum pump 100 stops suddenly or any other trouble happens in the vacuum pump 100, the semiconductor fabrication apparatus in its entirety may be affected and a serious damage may be caused. Accordingly, it is preferable to use the highly durable and reliable combined bearing 10 according to the present invention in the vacuum pump 100 for the semiconductor fabrication apparatus. It should be noted that the vacuum pump 100 can be used for various kinds of apparatuses other than the semiconductor fabrication apparatus.

Figure 5:
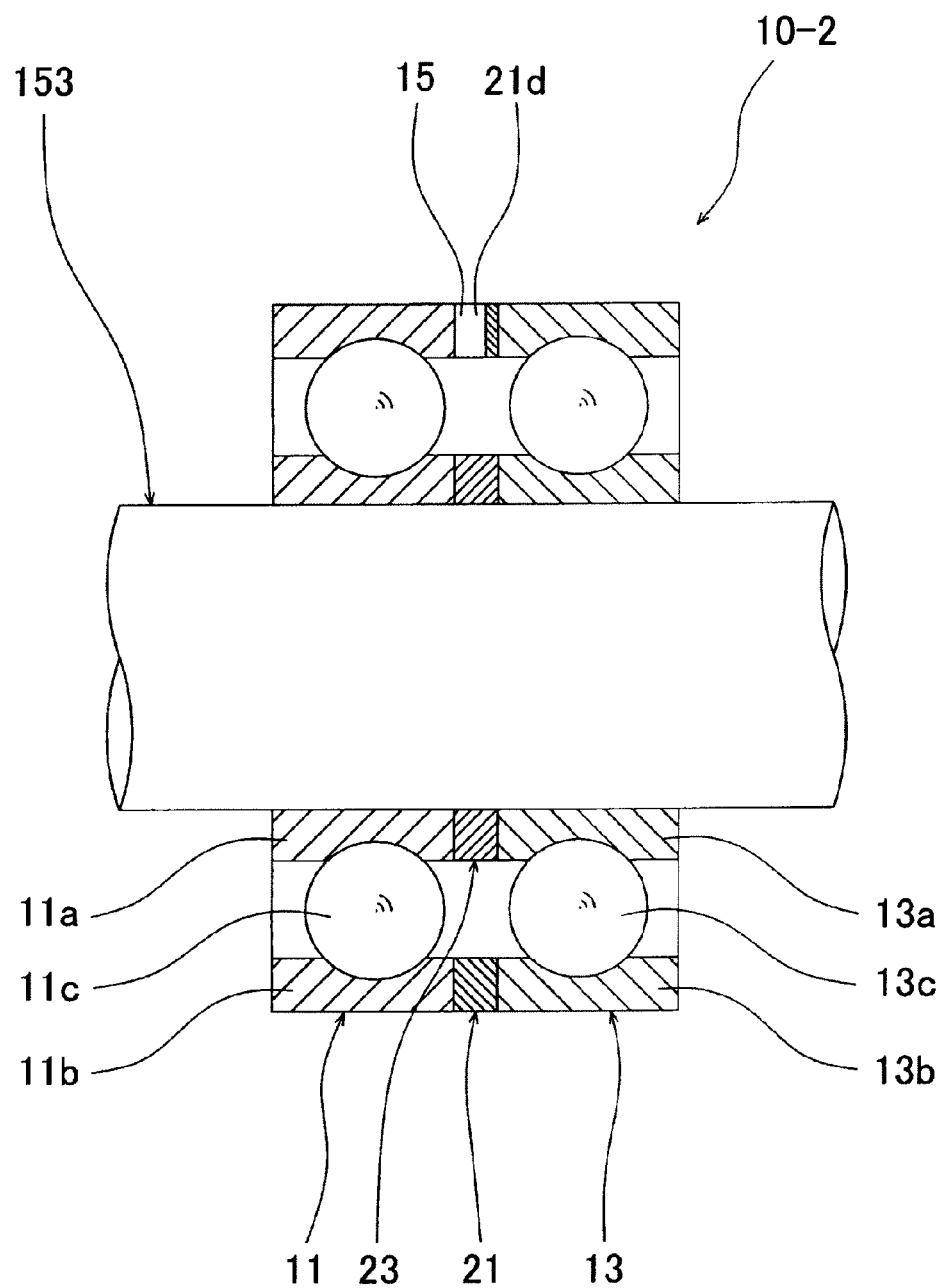
FIG. 5 is an enlarged cross-sectional view showing an essential part of another example of the combined bearing.
Figure 6:
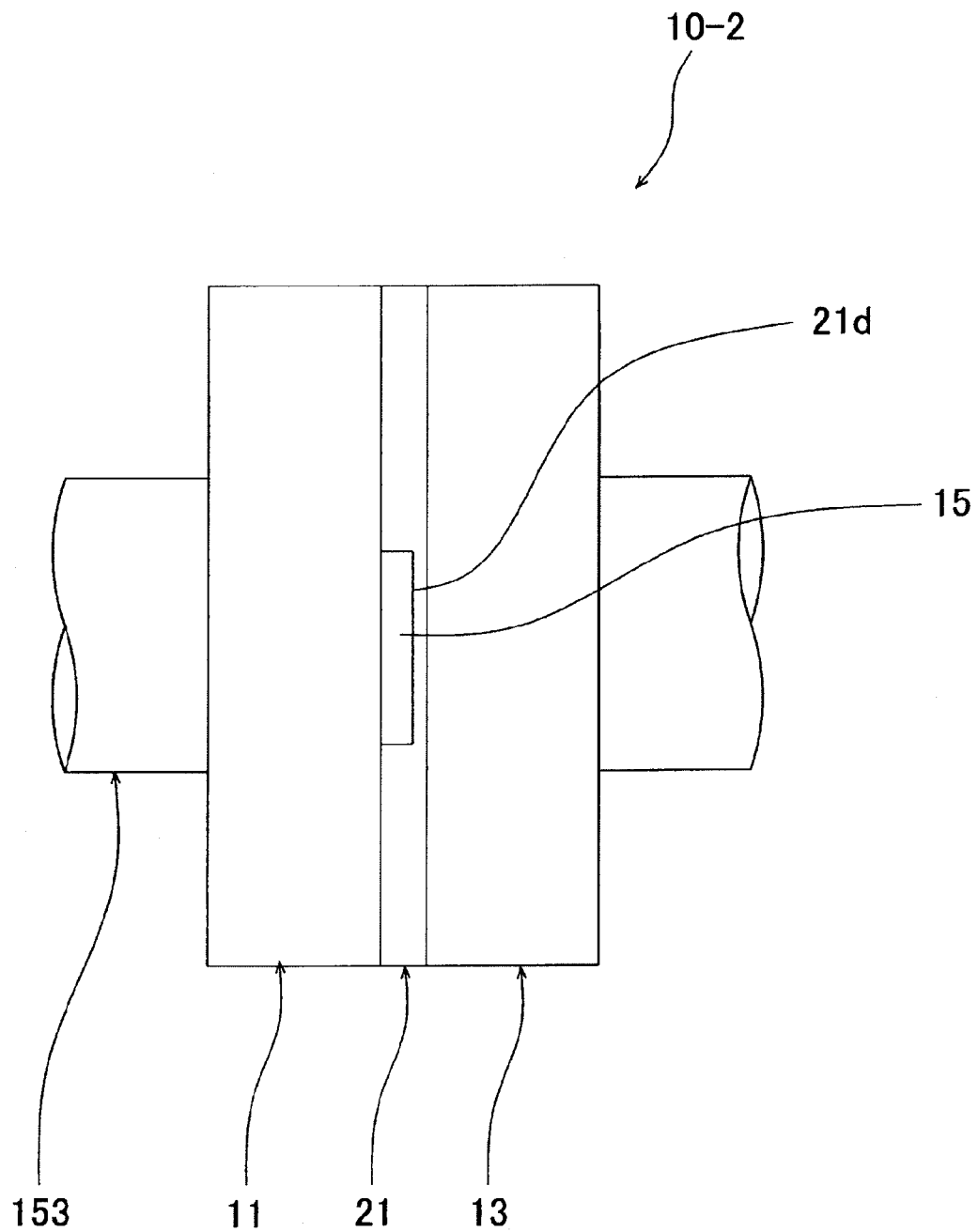
FIG. 6 is a view of the combined bearing in FIG. 5 as viewed from above.

FIG. 5 is an enlarged cross-sectional view showing an essential part of combined bearing 10-2 according to a second embodiment of the present invention. FIG. 6 is a view of the combined bearing 10-2 in FIG. 5 as viewed from above. In the combined bearing 10-2 shown in FIG. 5 and FIG. 6, elements, which are equivalent or similar to those of the combined bearing 10 according to the above-described embodiment shown in FIGS. 2 through 4, are denoted by the same reference numerals. In addition, structures and functions that will not be described below are the same as those in the above-described embodiment shown in FIGS. 2 through 4. The combined bearing 10-2 differs from the above-described combined bearing 10 in the following respects. In the above-described embodiment shown in FIGS. 2 through 4, the end surfaces of two rolling bearings 11 and 13 face each other directly. Instead, in this embodiment, the end surfaces of two rolling bearings 11 and 13 face indirectly and are joined to each other through a ring-shaped outer ring spacer 21 and a ring-shaped inner ring spacer 23. The rolling bearings 11 and 13 are arranged on the same axis. A groove (or notch) 21d, which extends radially from an outer circumferential surface to an inner circumferential surface of the outer ring spacer 21, is formed on a side surface of the outer ring spacer 21. This groove 21d provides lubricating-oil inlet 15.

As with the above-described first embodiment, as the motor 163 is driven, the vacuum pump 100 is operated. Simultaneously, the lubricating oil 169 is supplied directly into the inner space formed between the rolling bearings 11 and 13 through the lubricating-oil inlet 15 of the combined bearing 10-2. The lubricating oil 169 thus supplied lubricates both of the rolling bearings 11 and 13 equally and sufficiently from the inside thereof in the same manner as the above-described first embodiment.

Specifically, also in the case of the combined bearing 10-2 according to the present embodiment, the lubricating oil 169 can be directly supplied into the inner space between the adjacent rolling bearings 11 and 13. Therefore, the lubricating oil 169 can lubricate these plural rolling bearings 11 and 13 easily, evenly, and sufficiently. Further, durability and reliability of the vacuum pump 100 using the combined bearing 10-2 are improved.

Figure 7:
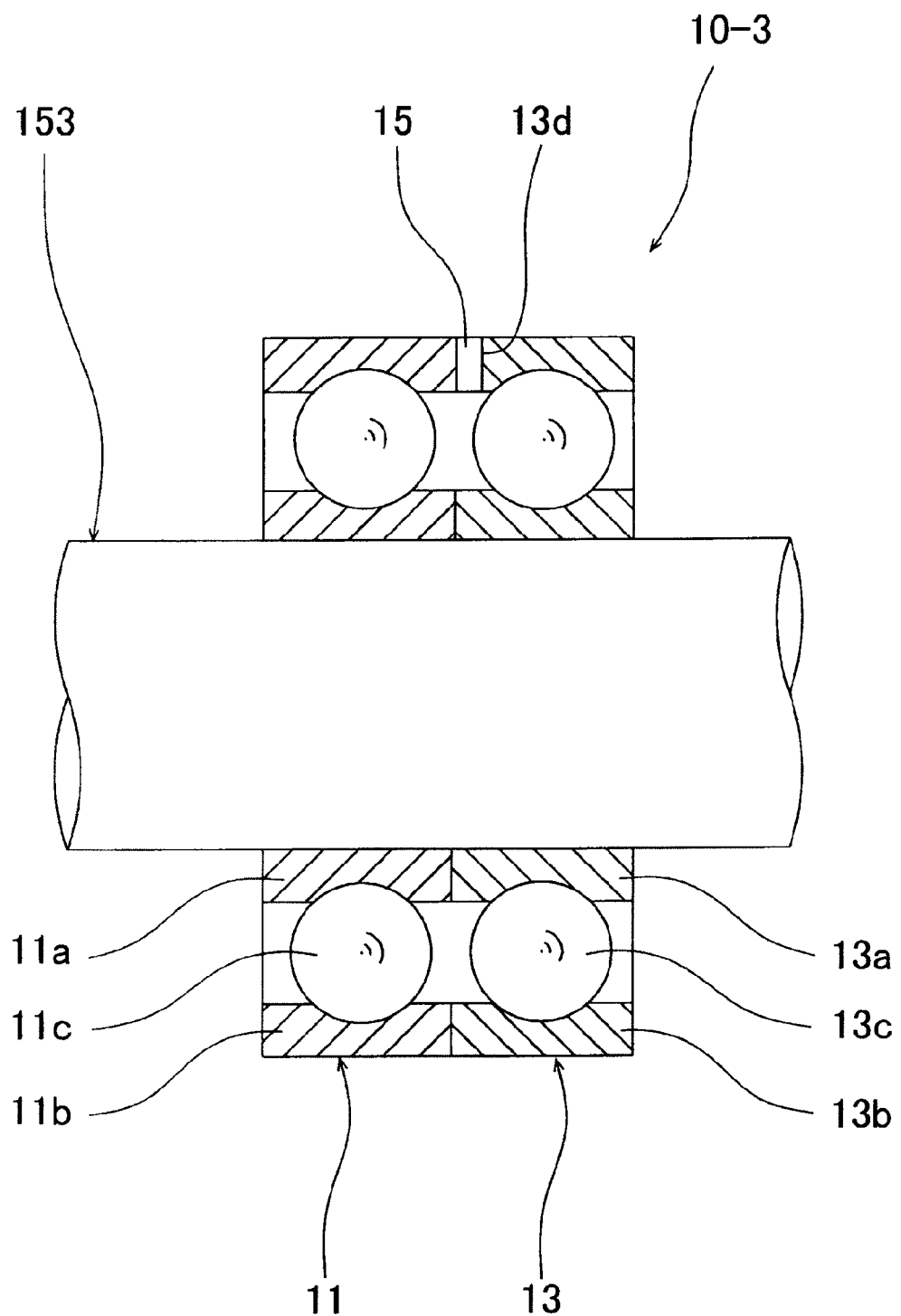
FIG. 7 is an enlarged cross-sectional view showing an essential part of still another example of the combined bearing.
Figure 8:
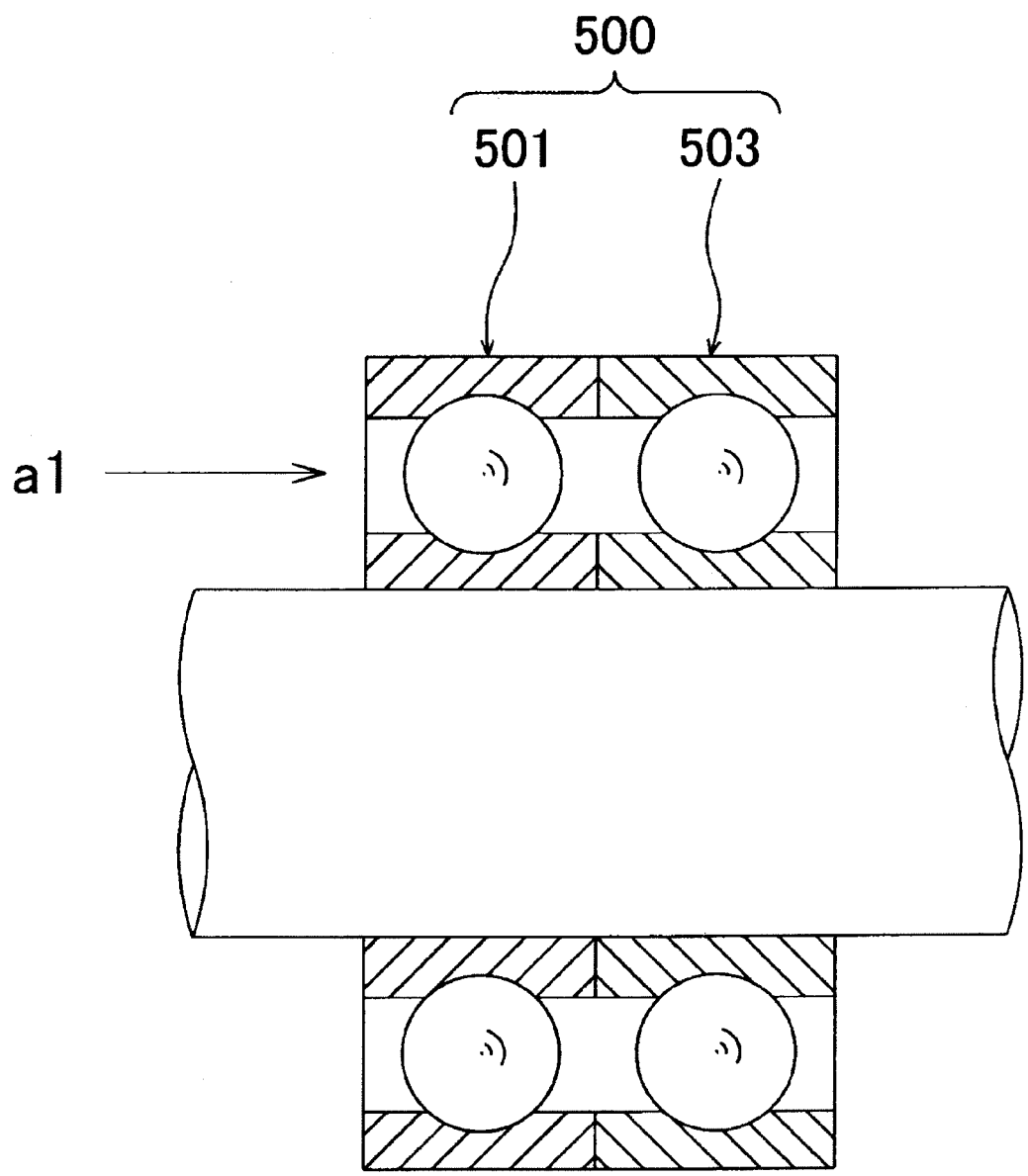
FIG. 8 is an enlarged cross-sectional view showing an essential part of a conventional combined bearing.

Although certain preferred embodiments of the present invention have been shown and described, it should be noted that various changes and modifications may be made within the scope of the appended claims, the specification, and the drawings. Any shape and structure, which are not described directly in the specification and drawings, may be within the scope of the technical concept of the present invention, so long as they have the same effects of the present invention. For example, while the grooves 11d and 13d are formed on both of the rolling bearings 11 and 13 to form the lubricating-oil inlet 15 in the above-described first embodiment, only the groove 13d may be formed on the outer ring 13b of the rolling bearing 13 to form the lubricating-oil inlet 15, as shown in a combined bearing 10-3 illustrated in FIG. 7. With this structure, because the groove 13d is provided only on the rolling bearing 13, the structure is more simplified and the production cost is also reduced. It is also possible to form only the groove 11d on the outer ring 11b of the rolling bearing 11 to form the lubricating-oil inlet 15. Further, while only one lubricating-oil inlet 15 is provided in the above-described embodiments, a plurality of lubricating-oil inlets 15 may be provided.

In the above-described embodiments, the two rolling bearings 11 and 13 are used to provide the combined bearing 10. Instead, three or more rolling bearings may be arranged on the same axis such that end surfaces thereof face each other directly or indirectly through the spacers to form the combined bearing. In this case, the lubricating-oil inlet is provided for all or at least one of inner spaces each formed between the adjacent rolling bearings. Further, while the ball bearings are used as the rolling bearings 11 and 13 in the above-described embodiments, other type of bearing, such as roller bearing, may be used. The rolling bearings 11 and 13 may have retainers or may not have retainers. The above-described embodiments are examples in which the combined bearing according to the present invention is applied to the vacuum pump. The combined bearing according to the present invention can be applied to various types of rotary machines (e.g., pumps of other types, compressors, shaft of machine tools), other than the vacuum pump, so long as the rotary machine has a shaft supported by a bearing.

What is claimed is:

1. A rotary machine comprising:
a lubricating oil chamber;
a combined bearing including:
a first roller bearing having an inner ring and an outer ring;
a second roller bearing in contact with said first roller bearing and arranged on the same axis as said first roller bearing, said second roller bearing having an inner ring and an outer ring; and
a lubricating oil inlet for introducing a lubricating oil into an inner space between said first roller bearing and said second roller bearing, said lubricating oil inlet being located on at least one of said outer ring of said first roller bearing and said outer ring of said second roller bearing;
a bearing case having an introduction passage communicating with said lubricating oil inlet;
a bearing cover having an upper surface configured to receive lubricating oil dripping from a ceiling of said lubricating oil chamber, and to introduce the received lubricating oil to said lubricating oil inlet via said introduction passage; and
a rotational shaft supported by said combined bearing.

2. The rotary machine according to claim 1, wherein said lubricating oil inlet comprises a groove formed on a side surface of said outer ring of said second roller bearing, and said side surface is in contact with a side surface of said outer ring of said first roller bearing.

3. The rotary machine according to claim 1, wherein said lubricating oil inlet comprises grooves formed respectively on a side surface of said outer ring of said first roller bearing and a side surface of said outer ring of said second roller bearing, and said side surface of said first roller bearing and said side surface of said second roller bearing are in contact with each other.

4. The rotary machine according to claim 1, wherein said rotary machine is a vacuum pump.

5. The rotary machine according to claim 1, further comprising an oil plate for splashing the lubricating oil in said lubricating oil chamber to said ceiling of said lubricating oil chamber.

6. The rotary machine according to claim 5, wherein said oil plate is connected to said rotational shaft so as to rotate as said rotational shaft rotates, said oil plate being shaped to splash the lubricating oil to said ceiling during rotation.

7. The rotary machine according to claim 1, wherein said upper surface of said bearing cover is inclined so to receive the lubricating oil dripping from said ceiling of said lubricating oil chamber, and so as to introduce the received lubricating oil to said lubricating oil inlet via said introduction passage.

8. The rotary machine according to claim 1, further comprising an oil reservoir for collecting the lubricating oil supplied to said combined bearing.

9. A rotary machine comprising:
a lubricating oil chamber;
a combined bearing including:
  a first roller bearing;
  a second roller bearing arranged on the same axis as said first roller bearing;
  an outer ring spacer and an inner ring spacer located between said first roller bearing and said second roller bearing; and
  a lubricating oil inlet for introducing a lubricating oil into an inner space between said first roller bearing and said second roller bearing, said lubricating oil inlet being located on said outer ring spacer;
a bearing case having an introduction passage communicating with said lubricating oil inlet;
a bearing cover having an upper surface configured to receive lubricating oil dripping from a ceiling of said lubricating oil chamber, and to introduce the received lubricating oil to said lubricating oil inlet via said introduction passage; and
a rotational shaft supported by said combined bearing.

10. The rotary machine according to claim 9, wherein said lubricating oil inlet comprises a groove formed on said outer ring spacer.

11. The rotary machine according to claim 9, wherein said rotary machine is a vacuum pump.

12. The rotary machine according to claim 9, further comprising an oil plate for splashing the lubricating oil in said lubricating oil chamber to said ceiling of said lubricating oil chamber.

13. The rotary machine according to claim 12, wherein said oil plate is connected to said rotational shaft so as to rotate as said rotational shaft rotates, said oil plate being shaped to splash the lubricating oil to said ceiling during rotation.

14. The rotary machine according to claim 9, wherein said upper surface of said bearing cover is inclined so to receive the lubricating oil dripping from said ceiling of said lubricating oil chamber, and so as to introduce the received lubricating oil to said lubricating oil inlet via said introduction passage.

15. The rotary machine according to claim 9, wherein said lubricating oil chamber has an oil reservoir for collecting the lubricating oil supplied to said combined bearing.

* * * * *